US012709582B2

(12) United States Patent
Liu et al.

(10) Patent No.: US 12,709,582 B2
(45) Date of Patent: Aug. 18, 2026

(54) ANTIBACTERIAL CERAMIC TILE AND PREPARATION METHOD THEREOF

(71) Applicant: MONALISA GROUP CO., LTD, Foshan City (CN)

(72) Inventors: Yijun Liu, Foshan City (CN); Kelin Zhang, Foshan City (CN); Yuandong Yang, Foshan City (CN); Qiuli Huang, Foshan City (CN); Guoqin Cao, Foshan City (CN)

(73) Assignee: MONALISA GROUP CO., LTD, Foshan City (CN)

( * ) Notice: Subject to any disclaimer, the term of this patent is extended or adjusted under 35 U.S.C. 154(b) by 332 days.

(21) Appl. No.: 18/553,267

(22) PCT Filed: Dec. 3, 2021

(86) PCT No.: PCT/CN2021/135274
§ 371 (c)(1),
(2) Date: Sep. 29, 2023

(87) PCT Pub. No.: WO2022/205989
PCT Pub. Date: Oct. 6, 2022

(65) Prior Publication Data

US 2024/0182373 A1 Jun. 6, 2024

(30) Foreign Application Priority Data

Apr. 1, 2021 (CN) ......................... 202110352934.1

(51) Int. Cl.
*C03C 8/00* (2006.01)
*C04B 41/52* (2006.01)
*C04B 41/89* (2006.01)

(52) U.S. Cl.
CPC ................ *C04B 41/89* (2013.01); *C03C 8/00* (2013.01); *C04B 41/52* (2013.01); *C03C 2204/02* (2013.01)

(58) Field of Classification Search
None
See application file for complete search history.

(56) References Cited

FOREIGN PATENT DOCUMENTS

| | | | | | |
|---|---|---|---|---|---|
| CN | 101648824 A | | 2/2010 | |
| CN | 1015198217 | * | 12/2015 | |
| CN | 105271753 A | | 1/2016 | |
| CN | 107043249 A | | 8/2017 | |
| CN | 105837258 B | * | 8/2018 | ............... C03C 8/00 |
| CN | 109265005 A | * | 1/2019 | ........... B28B 11/001 |
| CN | 110342818 A | * | 10/2019 | ............... C03C 8/00 |
| CN | 111056862 A | | 4/2020 | |
| CN | 111689689 A | | 9/2020 | |
| CN | 112062470 A | * | 12/2020 | ............... C03C 8/20 |
| CN | 112194476 A | | 1/2021 | |
| CN | 112194478 A | | 1/2021 | |
| KR | 20110018720 A | | 2/2011 | |
| TW | 201534574 A | * | 9/2015 | |

OTHER PUBLICATIONS

Machine Translation of Abstract of CN-105837258-B, Published Aug. 21, 2018.*
Machine Tranlsation of CN112062470A.*

* cited by examiner

*Primary Examiner* — David P Turocy
(74) *Attorney, Agent, or Firm* — Alleman Hall LLP

(57) ABSTRACT

The present invention discloses an antibacterial ceramic tile and a preparation method thereof. The method comprises applying an antibacterial protective glaze containing Ulan tea-quartz on the surface of a green body, and then firing to obtain an antibacterial ceramic tile. The mass percentage of Ulan tea-quartz to the antibacterial protective glaze is 35% to 45%. Controlling the mass percentage content of Ulan tea-quartz to the antibacterial protective glaze within the aforementioned range not only can achieve an excellent antibacterial property, but also avoids excessive glossiness, rough texture, or poor flatness of the ceramic glaze surface.

6 Claims, 1 Drawing Sheet

FIG. 1
SHAPING BY A PRESS → DRYING → APPLYING A COVER GLAZE → INKJETTING PATTERN → APPLYING AN ANTIBACTERIAL PROTECTIVE GLAZE → FIRING → EDGING → GRADING
FIG. 2
FIG. 3
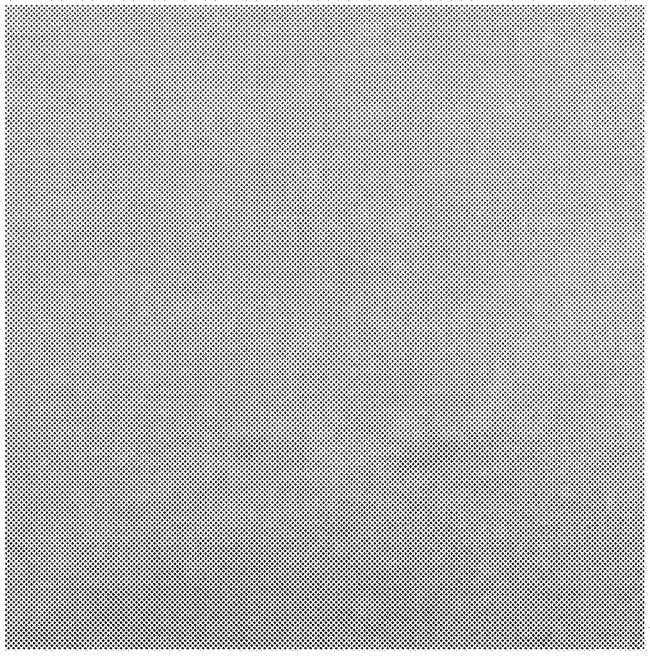

ANTIBACTERIAL CERAMIC TILE AND PREPARATION METHOD THEREOF

TECHNICAL FIELD

The present invention relates to an antibacterial ceramic tile and a preparation method thereof, which belongs to the technical field of ceramic tile production and manufacturing.

BACKGROUND

The purification of home environment and the cleaning of indoor air are very important for people's daily life. Ceramic tiles are used as home decoration materials and people come into contact with the ceramic tiles more in daily life. Therefore, several major ceramic brands in the industry have strenuously developed ceramics with an antibacterial function.

TECHNICAL PROBLEM

Some ceramic manufacturing enterprises have launched ceramic tiles with antibacterial function at present. For example, negative ion powder is added for sterilization, but due to the fact that the negative ion powder mainly relies on the excitation of radioactive elements for sterilization, the ceramic products have a certain radioactivity. For example, a photocatalytic mechanism is adopted for sterilization, which is mainly achieved by coating nano titanium dioxide on the surface of ceramic products. Due to the need to rely on ultraviolet rays to stimulate titanium dioxide and in order to maintain its activity, ceramic products need to be low-temperature treated at around 300° C. Therefore, the durability of this type of ceramic products needs to be improved and ultraviolet rays are harmful to the human body. For example, antibacterial agents, such as silver and nano zinc oxide, are added into glaze for direct firing, but the high-temperature environment of firing can easily cause silver and nano zinc oxide to be oxidized and reacted, thereby decreasing the antibacterial effect.

TECHNICAL SOLUTION

In a first aspect, the present invention discloses a preparation method for an antibacterial ceramic tile. The method comprises applying an antibacterial protective glaze containing Ulan tea-quartz (also known as Ulan tea crystal or Ulan yellow quartz) on the surface of a green body, and then firing to obtain an antibacterial ceramic tile. The mass percentage content of Ulan tea-quartz in the antibacterial protective glaze is 35% to 45%, and the mass percentage content of alkaline earth metal oxides in the antibacterial protective glaze is more than 10%. Controlling the mass percentage content of Ulan tea-quartz to the antibacterial protective glaze within the aforementioned range not only can achieve an excellent antibacterial property, but also avoids excessive glossiness, rough texture, or poor flatness of the ceramic glaze surface.

Among the existing preparation methods for antibacterial ceramic tiles, some technical solutions adopt nano zinc oxide and single rare earth ions as antibacterial agents, which require firing to form a certain microporous structure in the glaze layer in order to achieve a good antibacterial effect. But the microporous structure is difficult to control. There are also some technical solutions that use rare earth ions to combine with titanium dioxide, wherein the rare earth ions control the grain size of the titanium dioxide and sterilization relies on the photocatalysis of nano titanium dioxide. The present invention adopts a composite bactericidal effect of multiple rare earth ions, without the need to form a microporous structure or rely on the photocatalysis of nano titanium dioxide. In the preparation method of the present invention, Ulan tea-quartz contains a variety of rare earth elements. Rare earth metals themselves belong to inorganic antibacterial materials. Through contact with bacteria, rare earth ions enter the interior of cells through transmembrane interactions, i.e., through transport channels. Highly reactive rare earth ions can react with intracellular organic macromolecules and affect bacterial proliferation. The ceramic glaze contains a high content of alkaline earth metal oxides (e.g., magnesium oxide, calcium oxide, barium oxide, and some trace oxides with relatively large atomic weight). Under the excitation of rare earth elements, the surface energy level of these metal oxides will increase. When subjected to light, metal ions are excited and undergo electron transfer, resulting in the generation of a large number of chemically active negative oxygen ions and free radical —OH groups by reacting with $O_2$ adsorbed in water and air on the surface of the glaze layer. When coming into contact with microbes, these negative oxygen ions and free radicals can oxidize and decompose the organic substances in the microbial body into $CO_2$ and $H_2O$, thus achieving a sterilizing effect in a short period of time.

In the existing preparation process of antibacterial ceramic tiles, there are also some technical solutions which mix a solution containing zinc salt and a solution containing rare earth ion salt to form an antibacterial salt solution, and then spray the antibacterial salt solution on the surface of transparent glaze to form an antibacterial layer. It is difficult to use existing production equipment to evenly spray the antibacterial agent on the surface of a green body through this method, and excessive spraying can cause problems such as glaze layer blistering or tile bursting in a kiln. Therefore, this method is more suitable for laboratory sample preparation than for mass production. Moreover, the antibacterial agent is distributed on the surface of the ceramic tile obtained by this method. If the tile surface is scratched and worn, it will have a great influence on the antibacterial effect. The present invention introduces rare earth ions through Ulan tea-quartz, which can uniformly distribute the rare earth ions in the glaze layer, i.e., there are rare earth ions present throughout the whole glaze layer. Moreover, the glaze application of the present invention is convenient, and even if the tile surface is scratched and abraded, the antibacterial effect will not be significantly impacted.

Preferably, the mineral composition of the antibacterial protective glaze includes, in percentage by mass: Ulan tea-quartz: 35% to 45%; clay: 15% to 25%; Ca—Mg—Ba—Zn flux mineral: 30% to 42%; and alumina: 5% to 8%. The Ca—Mg—Ba—Zn flux mineral refers to flux (type) mineral with a high content of calcium oxide, magnesium oxide, barium oxide and zinc oxide, which can be used to adjust the high-temperature viscosity, glossiness, and flatness of the glaze surface. The clay refers to aluminum silicate slat with bonding and plasticity. As an example, the mineral composition of the antibacterial protective glaze includes, in percentage by mass: Ulan tea-quartz: 35% to 45%; zinc oxide: 3% to 5%; barium carbonate: 15% to 20%; calcined talc: 7% to 9%; kaolin: 15% to 25%; alumina: 5% to 8%; and dolomite: 5% to 8%.

The existing technology utilizes the flowability characteristics of a slurry containing Ulan tea-quartz to improve the problem of introducing barium sulfate to make the glaze slurry prone to thixotropy, improve the bonding between the green body and glaze, and make the glaze surface silky and smooth, thus enabling the preparation of a glaze with a silk glaze effect. Unlike the above technical solution, the present invention utilizes the characteristic of low alumina content of Ulan tea-quartz and also introduces a large amount of Ca—Mg—Ba—Zn flux mineral to avoid excessive glossiness, rough texture, or poor flatness of ceramic glaze. In addition, the mass percentage of Ulan tea-quartz in the glaze with silk glaze effect is relatively low, and it is necessary to introduce albite to decrease the high-temperature viscosity of the glaze, reduce glaze surface crystallization, and increase the fluidity of the glaze. However, the antibacterial protective glaze of the present invention requires the use of a large amount of Ca—Mg—Ba—Zn flux mineral to ensure both the antibacterial property and high glaze surface quality.

Preferably, the chemical composition of the antibacterial protective glaze includes, in percentage by mass: $SiO_2$: 40% to 50%; $Al_2O_3$: 16% to 20%; alkali metal oxides: 3% to 6%; alkaline earth metal oxides: 15% to 23%; zinc oxide: 3 to 5%; and rare earth oxide: 17 ppm to 45 ppm.

Preferably, the chemical composition of the antibacterial protective glaze includes, in percentage by mass: $SiO_2$: 40% to 50%; $Al_2O_3$: 16% to 20%; $Fe_2O_3$: 0.21% to 0.31%; $TiO_2$: 0.21% to 0.31%; CaO: 1.5% to 3.0%; MgO: 3.0% to 5.0%; BaO: 11 to 15%; ZnO: 3% to 5%; $K_2O$: 2.0% to 3.0%; $Na_2O$: 1.3% to 2.3%; $La_2O_3$: 4 ppm to 9 ppm; $CeO_2$: 9 ppm to 20 ppm; $Nd_2O_3$: 2 ppm to 6 ppm; $Sm_2O_3$: 0.03 ppm to 1.5 ppm; $Eu_2O_3$: 0.09 ppm to 0.35 ppm; $Gd_2O_3$: 0.3 ppm to 1.5 ppm; $Tb_4O_7$: 0.03 ppm to 0.15 ppm; $Ho_2O_3$: 0.06 ppm to 0.15 ppm; $Er_2O_3$: 0.12 ppm to 0.35 ppm; $Tm_2O_3$: 0.01 ppm to 0.05 ppm; $Yb_2O_3$: 0.12 ppm to 0.35 ppm; $Lu_2O_3$: 0 ppm to 0.15 ppm; $Y_2O_3$: 1.8 ppm to 4.5 ppm; and loss on ignition: 8% to 10%.

Preferably, a method of applying the antibacterial protective glaze is glaze spraying, with a specific gravity of 1.35 g/cm$^3$ to 1.40 g/cm$^3$ and an application amount of 250 g/m$^2$ to 300 g/m$^2$.

Preferably, a maximum firing temperature can be 1,200° C. to 1,220° C., and a firing duration is 60 to 70 minutes.

Preferably, the preparation method further comprises applying a cover glaze on the surface of the green body before applying the antibacterial protective glaze containing Ulan tea-quartz on the surface of the green body.

Preferably, the chemical composition of the cover glaze includes, in percentage by mass: $SiO_2$: 60% to 68%; $Al_2O_3$: 20% to 24%; alkali metal oxides: 4% to 7%; and $ZrO_2$: 3.2 to 9.6%.

Preferably, a method of applying the cover glaze is glaze spraying, with a specific gravity of 1.40 g/cm$^3$ to 1.50 g/cm$^3$ and an application amount of 500 g/m$^2$ to 600 g/m$^2$.

In a second aspect, the present invention provides an antibacterial ceramic tile obtained by any of the above-mentioned preparation methods. The antibacterial rates of *Escherichia coli* and *Staphylococcus aureus* of the antibacterial ceramic tiles are both greater than 90%.

In a third aspect, the present invention discloses an application of Ulan tea-quartz in antibacterial ceramic tiles.

BRIEF DESCRIPTION OF DRAWINGS

FIG. 1 is a flowchart of the preparation of an antibacterial ceramic tile in Example 1 of the present invention.

FIG. 2 is a tile surface effect picture of the antibacterial ceramic tile in Example 1 of the present invention.

FIG. 3 is a tile surface effect picture of an antibacterial ceramic tile in Comparative Example 3 of the present invention.

DETAILED DESCRIPTION OF PREFERRED EMBODIMENTS

The present invention will be further illustrated by the following embodiments, and it should be understood that the following embodiments are only used to illustrate the present invention rather than to limit it. Unless otherwise specified, each percentage refers to a percentage by mass. A preparation method for an antibacterial ceramic tile according to the present invention is exemplarily illustrated hereinafter.

A green body is prepared. The powder of the green body may be dry-pressed to form the green body. The composition of the green body powder is not limited, and conventional green body powder for ceramic tiles in the art may be adopted. For example, the chemical composition of the green body powder includes, in percentage by mass: $SiO_2$: 63.5% to 65%; $Al_2O_3$: 19% to 22%; $Fe_2O_3$: 0.4% to 0.7%; $TiO_2$: 0.25% to 0.35%; CaO: 0.25% to 0.35%; MgO: 0.5% to 0.80%; $K_2O$: 2.0% to 2.4%; $Na_2O$: 2.6% to 3.0%; and loss on ignition: 4.5% to 5.5%.

The green body is dried. The moisture content of the dried green body is controlled within 0.3 wt % to 0.5 wt %. The drying time may be 50 to 60 minutes.

A cover glaze is prepared. The chemical composition of the cover glaze may include, in percentage by mass: $SiO_2$: 60% to 68%; $Al_2O_3$: 20% to 24%; alkali metal oxides: 4% to 7%; and $ZrO_2$: 3.2 to 9.6%.

The mineral composition of the cover glaze may include, in percentage by mass: potassium feldspar: 30% to 40%; albite: 15% to 25%; kaolin: 5% to 15%; quartz sand: 10% to 20%; zirconium silicate: 5% to 15%; calcined kaolin: 5% to 10%; and alumina: 5% to 10%.

After weighing the materials of the cover glaze according to the aforementioned mineral proportioning, the materials are mixed, ball-milled, and sieved to obtain a cover glaze slurry. In the process of ball milling, auxiliary materials and water are added into the mixed raw materials. In some embodiments, the material proportion of the cover glaze slurry is, in percentage by mass, dry material of cover glaze (i.e., the sum of the mineral composition masses of the cover glaze): 70.4% to 72.4%; sodium tripolyphosphate: 0.11% to 0.16%; carboxy methyl cellulose sodium (CMC): 0.14% to 0.21%; and water: 28.5% to 29.5%. The cover glaze slurry has a sieve residue of less than or equal to 0.6 wt % on a 325-mesh sieve.

In some embodiments, the chemical composition of the cover glaze includes, in percentage by mass: $SiO_2$: 60% to 68%; $Al_2O_3$: 20% to 24%; $Fe_2O_3$: 0.3% to 0.6%; $TiO_2$: 0.20% to 0.30%; CaO: 0.3% to 0.6%; MgO: 0.1% to 0.3%; $K_2O$: 1.5% to 2.5%; $Na_2O$: 3.0% to 4.0%; $ZrO_2$: 3.2% to 9.6%; and loss on ignition: 1.3% to 1.7%.

The linear expansion coefficient of the cover glaze at 40° C. to 400° C. may be $8.1716\times10^{-6}$/K to $8.3916\times10^{-6}$/K. The linear expansion coefficient of the cover glaze should be as close as possible to or greater than that of the green body, so as to facilitate the adjustment of the tile shape during firing.

The cover glaze is applied on the surface of the dried green body. The cover glaze may be applied by glaze spraying. For example, the process parameters of the glaze spraying may be as follows: a specific gravity of 1.40 g/cm$^3$ to 1.50 g/cm$^3$, and an application amount of 500 g/m$^2$ to 600 g/m$^2$.

A pattern is inkjet-printed on the surface of the green body after the cover glaze is sprayed. The color and design of the inkjet-printed pattern vary according to layout design effects.

An antibacterial protective glaze (also referred to as "protective glaze") is prepared. The chemical composition of the antibacterial protective glaze may include, in percentage by mass: $SiO_2$: 40% to 50%; $Al_2O_3$: 16% to 20%; alkali metal oxides: 3% to 6%; alkaline earth metal oxides: 15% to 23%; zinc oxide: 3 to 5%; and rare earth oxide: 17 ppm to 45 ppm.

The mass percentage content of Ulan tea-quartz in the aforementioned antibacterial protective glaze is 35% to 45%. The mechanism by which Ulan tea-quartz exerts its far-infrared function in the present invention is to provide lanthanide rare earth ions to be doped into the crystal lattice of $MgO—SiO_2—Al_2O_3$ in the glaze, forming highly asymmetric magnesium aluminum silicate compounds, that promote a high far-infrared ray emission function of the glaze. The present invention achieves the antibacterial function through Ulan tea-quartz. Ulan tea-quartz contains a variety of rare earth elements. Rare earth metals themselves belong to inorganic antibacterial materials. Through contact with bacteria, rare earth ions enter the interior of cells through transmembrane interactions, i.e., through transport channels. Highly reactive rare earth ions can react with intracellular organic macromolecules and affect bacterial proliferation. While the ceramic glaze contains a high content of alkaline earth metal oxides (e.g., magnesium oxide, calcium oxide, barium oxide, and some trace oxides with relatively large atomic weight). Under the excitation of rare earth elements, the surface energy level of these metal oxides will increase. Under the action of light, metal ions are excited and undergo electron transfer, resulting in the generation of a large number of chemically active negative oxygen ions and free radicals —OH groups by reacting with $O_2$ adsorbed in water and air on the surface of the glaze layer. When coming into contact with microbes, these negative oxygen ions and free radicals can oxidize and decompose the organic substances in the microbial body into $CO_2$ and $H_2O$, thus achieving a sterilizing effect in a short period of time.

The chemical composition of Ulan tea-quartz may include, in percentage by mass: $SiO_2$: 70% to 80%; $Al_2O_3$: 10% to 15%; $Fe_2O_3$: 0.05% to 0.15%; $P_2O_5$: 0.25% to 0.35%; CaO: 0.5% to 1.0%; MgO: 0.1% to 0.3%; $K_2O$: 4.0% to 6.0%; $Na_2O$: 3.0% to 5.0%; $La_2O_3$: 14 ppm to 17 ppm; $CeO_2$: 35 ppm to 40 ppm; $Nd_2O_3$: 9 ppm to 12 ppm; $Sm_2O_3$: 1 ppm to 3 ppm; $Eu_2O_3$: 0.3 ppm to 0.7 ppm; $Gd_2O_3$: 1 ppm to 3 ppm; $Tb_4O_7$: 0.1 ppm to 0.3 ppm; $Ho_2O_3$: 0.2 ppm to 0.3 ppm; $Er_2O_3$: 0.4 ppm to 0.7 ppm; $Tm_2O_3$: 0.05 ppm to 0.1 ppm; $Yb_2O_3$: 0.4 ppm to 0.7 ppm; $Lu_2O_3$: 0 ppm to 0.3 ppm; $Y_2O_3$: 6 ppm to 9 ppm; and loss on ignition: 0.5% to 1.0%. Ulan tea-quartz contains trace amounts of various rare earth metal elements, and does not contain antibacterial agents, such as silver and zinc oxide. Moreover, Ulan tea-quartz has low radioactivity, high temperature resistance, long lasting effect, excellent antibacterial function, and is non-toxic and harmless to the human body and the environment. Adding Ulan tea-quartz powder into the glaze can make the ceramic tile have an antibacterial function.

The mineral composition of the antibacterial protective glaze may include, in percentage by mass: Ulan tea-quartz: 35% to 45%; clay: 15% to 25%; Ca—Mg—Ba—Zn flux mineral: 30% to 42%; and alumina: 5% to 8%. The formula of the antibacterial protective glaze avoids the introduction of a large amount of strong flux such as lithium carbonate, which can prevent the strong fluxing characteristic of lithium carbonate from having a great influence on the antibacterial effect of the rare earth elements.

Ulan tea-quartz used in the present invention contains multiple rare earth ions, and there is a synergistic antibacterial effect between different rare earth ions, which broadens the antibacterial range of the antibacterial ceramic tile and improves its antibacterial stability. Moreover, the uniform presence of rare earth ions in the glaze layer makes the antibacterial ceramic tile still have a strong antibacterial effect after a certain degree of abrasive wear.

In some embodiments, the mineral composition of the antibacterial protective glaze may include, in percentage by mass: Ulan tea-quartz: 35% to 45%; zinc oxide: 3% to 5%; barium carbonate: 15% to 20%; calcined talc: 7% to 9%; kaolin: 15% to 25%; alumina: 5% to 8%; and dolomite: 5% to 8%.

If Ulan tea-quartz is used in the green body, it will result in poor antibacterial property on the surface of the ceramic tile due to the glaze covering the green body. Therefore, it is still necessary to apply an antibacterial glaze on the ceramic tile surface to impart the antibacterial property to the ceramic tile surface, but this will undoubtedly increase the complexity of the process and the production cost. In addition, it was found in an experiment that the reaction of Ulan tea-quartz in the ceramic green body was not violent, and the antibacterial effect of rare earth elements would not decrease as well. However, Ulan tea-quartz reacts violently in the protective glaze and would reduce the antibacterial effect of rare earth elements. In view of this, the present invention proposes to combine a specific content of Ulan tea-quartz with Ca—Mg—Ba—Zn flux mineral having a high content of alkaline metal oxide to improve the antibacterial effect and ensure the glaze surface quality.

After weighing the materials of the antibacterial protective glaze according to the aforementioned mineral proportioning, the mixture is mixed, ball-milled, and sieved to obtain a protective glaze slurry. In the process of ball milling, auxiliary materials and water are added into the mixed materials. In some embodiments, the material proportion of the protective glaze slurry is dry material of protective glaze (i.e., the sum of the mineral composition masses of the protective glaze materials): 71.5% to 73.5%; sodium tripolyphosphate: 0.14% to 0.21%; carboxy methyl cellulose sodium (CMC): 0.10% to 0.12%; and water: 27% to 29%. The protective glaze slurry has a sieve residue of less than or equal to 0.3 wt % on a 325-mesh sieve.

In some embodiments, the chemical composition of the antibacterial protective glaze includes, in percentage by mass: $SiO_2$: 40% to 50%; $Al_2O_3$: 16% to 20%; $Fe_2O_3$: 0.21% to 0.31%; $TiO_2$: 0.21% to 0.31%; CaO: 1.5% to 3.0%; MgO: 3.0% to 5.0%; BaO: 11 to 15%; ZnO: 3% to 5%; $K_2O$: 2.0% to 3.0%; $Na_2O$: 1.3% to 2.3%; $La_2O_3$: 4 ppm to 9 ppm; $CeO_2$: 9 ppm to 20 ppm; $Nd_2O_3$: 2 ppm to 6 ppm; $Sm_2O_3$: 0.03 ppm to 1.5 ppm; $Eu_2O_3$: 0.09 ppm to 0.35 ppm; $Gd_2O_3$: 0.3 ppm to 1.5 ppm; $Tb_4O_7$: 0.03 ppm to 0.15 ppm; $Ho_2O_3$: 0.06 ppm to 0.15 ppm; $Er_2O_3$: 0.12 ppm to 0.35 ppm; $Tm_2O_3$: 0.01 ppm to 0.05 ppm; $Yb_2O_3$: 0.12 ppm to 0.35 ppm; $Lu_2O_3$: 0 ppm to 0.15 ppm; $Y_2O_3$: 1.8 ppm to 4.5 ppm; and loss on ignition: 8% to 10%.

The linear expansion coefficient of the antibacterial protective glaze at 40° C. to 400° C. may be $6.0416\times10^{-6}$/K to $6.3516\times10^{-6}$/K. Controlling the linear expansion coefficient of the antibacterial protective glaze within this range can prevent the linear expansion coefficient of the antibacterial protective glaze from being too low and affecting the tile shape of the ceramic tile, and moreover, it can also be adapted to the formula of the antibacterial protective glaze to ensure its antibacterial property and high glaze surface quality.

The antibacterial protective glaze is applied on the surface of the green tile after the pattern is inkjet-printed. The protective glaze may be applied by glaze spraying. In some embodiments, the process parameters of the glaze spraying are as follows: a specific gravity of 1.35 $g/cm^3$ to 1.40 $g/cm^3$, and an application amount of 250 $g/m^2$ to 300 $g/m^2$.

According to the present invention, the ceramic tile can have excellent antibacterial property by means of the antibacterial protective glaze. The antibacterial rates of *Escherichia coli* and *Staphylococcus aureus* in the ceramic tile are both greater than or equal to 90%.

Finally, the green body with the antibacterial protective glaze is fired. As an example, the maximum firing temperature is 1,220° C., and the firing duration is 70 minutes.

The existing technology also proposes to use layered clay to adsorb strontium ions and a single type of rare earth ion between clay crystal layers, achieving an antibacterial effect generated by activation of rare earth ions and increasing the heat resistance of antibacterial particles. However, this technology of using an aqueous clay solution will produce a lot of unsealed pores (open pores) on the surface of the ceramic tile, leading to a decrease in the sintering degree of the ceramic tile, thereby reducing the abrasion resistance of the glaze layer. The present invention adopts the composite antibacterial function of various rare earth ions, without the use of layered clay, and the abrasion resistance of the ceramic tile is also excellent.

Examples will be given to further illustrate the present invention in detail below. It should also be understood that the following examples are only used to further illustrate the present invention rather than to limit the protection scope of the present invention. All non-essential improvements and adjustments which are made by those skilled in the art according to the above contents of the present invention shall fall within the protection scope of the present invention. The specific technological parameters of the following examples are merely one example in an appropriate range, that is, those skilled in the art can make choices within the appropriate range through the description herein, but the choices are not limited to the specific values of the following examples.

The linear expansion coefficient of the cover glaze and the antibacterial protective glaze was tested according to Test methods of ceramic tiles—Part 8: Determination of linear thermal expansion (GB/T 3810.8-2016, Chinese National Standards). The antibacterial test method of the ceramic tile was carried out according to the standard of Antiseptic function of antibacterial ceramic (JC/T 897-2014, Chinese Industry Standards). The abrasion resistance test method of the ceramic tile was carried out according to the standard of Determination of resistance to surface abrasion for glazed tiles (GB/T 3810.7-2016, Chinese National Standards).

Example 1

Step 1: Powder of green body was shaped by a press to obtain a green body.

Step 2: The green body was dried.

Step 3: A cover glaze was sprayed on the surface of the dried green body. The mineral composition of the cover glaze formula includes, in percentage by mass: potassium feldspar: 35%; albite: 20%; kaolin: 10%; quartz sand: 10%; zirconium silicate: 10%; calcined kaolin: 10%; and alumina: 5%. The chemical composition of the cover glaze includes, in percentage by mass: $SiO_2$: 64.65%; $Al_2O_3$: 21.13%; $Fe_2O_3$: 0.32%; $TiO_2$: 0.23%; CaO: 0.44%; MgO: 0.15%; $K_2O$: 2.14%; $Na_2O$: 3.37%; $ZrO_2$: 6.37%; and loss on ignition: 1.5%. The linear expansion coefficient of the cover glaze at 40° C. to 400° C. was $8.1716\times10^{-6}$/K to $8.3916\times10^{-6}$/K.

Step 4: A pattern was inkjet-printed on the surface of the green body after spraying the cover glaze.

Step 5: An antibacterial protective glaze was sprayed on the surface of the green body after the pattern was inkjet-printed. The mineral composition of the antibacterial protective glaze includes, in percentage by mass: Ulan tea-quartz: 41%; zinc oxide: 4%; barium carbonate: 15%; calcined talc: 7%; kaolin: 20%; alumina: 5%; and dolomite: 8%. The chemical composition of the antibacterial protective glaze includes, in percentage by mass: $SiO_2$: 46.16%; $Al_2O_3$: 17.37%; $Fe_2O_3$: 0.25%; $TiO_2$: 0.24%; CaO: 2.92%; MgO: 4.09%; BaO: 11.63%; ZnO: 3.97%; $K_2O$: 2.60%; $Na_2O$: 1.74%; $La_2O_3$: 7 ppm; $CeO_2$: 15 ppm; $Nd_2O_3$: 4 ppm; $Sm_2O_3$: 1 ppm; $Eu_2O_3$: 0.18 ppm; $Gd_2O_3$: 0.77 ppm; $Tb_4O_7$: 0.07 ppm; $Ho_2O_3$: 0.09 ppm; $Er_2O_3$: 0.22 ppm; $Tm_2O_3$: 0.02 ppm; $Yb_2O_3$: 0.25 ppm; $Lu_2O_3$: 0.07 ppm; $Y_2O_3$: 2.9 ppm; and loss on ignition: 9.48%. The linear expansion coefficient of the antibacterial protective glaze at 40° C. to 400° C. was $6.0416\times10^{-6}$/K to $6.3516\times10^{-6}$/K.

Step 6: The green body was fired in a kiln. The maximum firing temperature was 1,200° C. to 1,220° C., and the firing duration was 60 to 70 minutes.

The antibacterial test showed that the antibacterial rate of the ceramic tile in Example 1 was 93.3% for *Escherichia coli* and 91.8% for *Staphylococcus aureus*. The abrasion resistance test shows that the ceramic tile in Example 1 has an abrasion resistance of 2,100 rpm to four levels.

Comparative Example 1

Comparative Example 1 is substantially the same as Example 1, except that the mineral composition of an antibacterial protective glaze includes, in percentage by mass: Ulan tea-quartz: 20%; potassium feldspar: 21%; zinc oxide: 4%; barium carbonate: 15%; calcined talc: 7%; kaolin: 20%; alumina: 5%; and dolomite: 8%. The chemical composition of the antibacterial protective glaze includes, in percentage by mass: $SiO_2$: 44.57%; $Al_2O_3$: 17.72%; $Fe_2O_3$: 0.23%; $TiO_2$: 0.22%; CaO: 2.77%; MgO: 4.20%; BaO: 11.67%; ZnO: 3.97%; $K_2O$: 4.18%; $Na_2O$: 1.36%; $La_2O_3$: 3.5 pm; $CeO_2$: 7.5 ppm; $Nd_2O_3$: 2 ppm; $Sm_2O_3$: 0.5 ppm; $Eu_2O_3$: 0.09 ppm; $Gd_2O_3$: 0.38 ppm; $Tb_4O_7$: 0.03 ppm; $Ho_2O_3$: 0.05 ppm; $Er_2O_3$: 0.11 ppm; $Tm_2O_3$: 0.01 ppm; $Yb_2O_3$: 0.13 ppm; $Lu_2O_3$: 0.04 ppm; $Y_2O_3$: 1.5 ppm; and loss on ignition: 9.29%.

The antibacterial test showed that the antibacterial rate of the ceramic tile in Comparative Example 1 was 40.7% for *Escherichia coli* and 68.5% for *Staphylococcus aureus*. This is because the amount of Ulan tea-quartz used in antibacterial protective glaze is relatively low, resulting in a significant decrease in the antibacterial effect of ceramic tile.

Comparative Example 2

Comparative Example 2 is substantially the same as Example 1, except that the mineral composition of an antibacterial protective glaze includes, in percentage by mass: Ulan tea-quartz: 41%; albite: 24%; barium carbonate: 5%; calcined talc: 2%; kaolin: 20%; alumina: 5%; and dolomite: 3%. The chemical composition of the antibacterial protective glaze includes, in percentage by mass: $SiO_2$: 59.96%; $Al_2O_3$: 20.37%; $Fe_2O_3$: 0.24%; $TiO_2$: 0.23%; CaO: 1.36%; MgO: 1.79%; BaO: 3.89%; $K_2O$: 3.93%; $Na_2O$: 3.47%; $La_2O_3$: 7 pm; $CeO_2$: 15 ppm; $Nd_2O_3$: 4 ppm; $Sm_2O_3$: 1 ppm; $Eu_2O_3$: 0.18 ppm; $Gd_2O_3$: 0.77 ppm; $Tb_4O_7$: 0.07 ppm; $Ho_2O_3$: 0.09 ppm; $Er_2O_3$: 0.22 ppm; $Tm_2O_3$: 0.02 ppm; $Yb_2O_3$: 0.25 ppm; $Lu_2O_3$: 0.07 ppm; $Y_2O_3$: 2.9 ppm; and loss on ignition: 4.91%.

The antibacterial test showed that the antibacterial rate of the ceramic tile in Comparative Example 2 was 66.3% for *Escherichia coli* and 77.5% for *Staphylococcus aureus*. Although the amount of Ulan tea-quartz used for antibacterial protection glaze in Comparative Example 2 is sufficient, the content of magnesium oxide, zinc oxide, titanium oxide, calcium oxide, zirconium oxide, and some trace oxides with relatively large atomic weights in the glaze decreases, especially the content of the alkaline earth metal oxides is less than 10%, resulting in less negative oxygen ions and free radical —OH groups produced by the antibacterial glaze. Therefore, the antibacterial effect of ceramic tile decreases accordingly.

Comparative Example 3

Comparative Example 3 is substantially the same as Example 1, except that the mineral composition of an antibacterial protective glaze includes, in percentage by mass: Ulan tea-quartz: 42%; albite: 20%; calcined talc: 5%; kaolin: 18%; alumina: 10%; dolomite: 3%; and zinc oxide: 2%. The chemical composition of the antibacterial protective glaze includes, in percentage by mass: $SiO_2$: 58.71%; $Al_2O_3$: 24.11%; $Fe_2O_3$: 0.22%; $TiO_2$: 0.21%; CaO: 1.35%; MgO: 2.76%; $K_2O$: 3.96%; $Na_2O$: 3.13%; $La_2O_3$: 7 pm; $CeO_2$: 15 ppm; $Nd_2O_3$: 4 ppm; $Sm_2O_3$: 1 ppm; $Eu_2O_3$: 0.18 ppm; $Gd_2O_3$: 0.77 ppm; $Tb_4O_7$: 0.07 ppm; $Ho_2O_3$: 0.09 ppm; $Er_2O_3$: 0.22 ppm; $Tm_2O_3$: 0.02 ppm; $Yb_2O_3$: 0.25 ppm; $Lu_2O_3$: 0.07 ppm; $Y_2O_3$: 2.9 ppm; and loss on ignition: 3.62%.

Although the amount of Ulan tea-quartz used in the antibacterial protection glaze is sufficient, due to the low amount of the Ca—Mg—Ba—Zn flux mineral and the use of alumina to adjust the glossiness of the glaze surface, the glaze surface as shown in FIG. 3 is relatively rough and lacks an exquisite feeling. In addition, due to the poor glaze surface effect, the antibacterial property of the ceramic tile cannot be detected.

What is claimed is:

1. A preparation method for an antibacterial ceramic tile, comprising:

applying an antibacterial protective glaze containing Ulan tea-quartz on a surface of a green body; and firing to obtain an antibacterial ceramic tile, wherein a mineral composition of the antibacterial protective glaze includes, in percentage by mass: Ulan tea-quartz: 35% to 45%, clay: 15% to 25%, Ca—Mg—Ba—Zn flux mineral: 30% to 42%, and alumina: 5% to 8%; the Ca—Mg—Ba—Zn flux mineral is flux mineral containing calcium oxide, magnesium oxide, barium oxide and zinc oxide, used to adjust a high-temperature viscosity of the antibacterial protective glaze, glossiness, and flatness of the surface; and the clay is an aluminum silicate with bonding and plasticity; and the barium oxide contained in the Ca—Mg—Ba—Zn flux mineral is added in the form of barium carbonate;

a chemical composition of the Ulan tea-quartz includes, in percentage by mass: $SiO_2$: 70% to 80%, $Al_2O_3$: 10% to 15%, $Fe_2O_3$: 0.05% to 0.15%, $P_2O_5$: 0.25% to 0.35%, CaO: 0.5% to 1.0%, MgO: 0.1% to 0.3%, $K_2O$: 4.0% to 6.0%, $Na_2O$: 3.0% to 5.0%, $La_2O_3$: 14 ppm to 17 ppm, $CeO_2$: 35 ppm to 40 ppm, $Nd_2O_3$: 9 ppm to 12 ppm, $Sm_2O_3$: 1 ppm to 3 ppm, $Eu_2O_3$: 0.3 ppm to 0.7 ppm, $Gd_2O_3$: 1 ppm to 3 ppm, $Tb_4O_7$: 0.1 ppm to 0.3 ppm, $Ho_2O_3$: 0.2 ppm to 0.3 ppm, $Er_2O_3$: 0.4 ppm to 0.7 ppm, $Tm_2O_3$: 0.05 ppm to 0.1 ppm, $Yb_2O_3$: 0.4 ppm to 0.7 ppm, $Lu_2O_3$: 0 ppm to 0.3 ppm, $Y_2O_3$: 6 ppm to 9 ppm; and loss on ignition: 0.5% to 1.0%;

a chemical composition of the antibacterial protective glaze includes, in percentage by mass: $SiO_2$: 40% to 50%; $Al_2O_3$: 16% to 20%; $Fe_2O_3$: 0.21% to 0.31%; $TiO_2$: 0.21% to 0.31%; CaO: 1.5% to 3.0%; MgO: 3.0% to 5.0%; BaO: 11 to 15%; ZnO: 3% to 5%; $K_2O$: 2.0% to 3.0%; $Na_2O$: 1.3% to 2.3%; $La_2O_3$: 4 ppm to 9 ppm; $CeO_2$: 9 ppm to 20 ppm; $Nd_2O_3$: 2 ppm to 6 ppm; $Sm_2O_3$: 0.03 ppm to 1.5 ppm; $Eu_2O_3$: 0.09 ppm to 0.35 ppm; $Gd_2O_3$: 0.3 ppm to 1.5 ppm; $Tb_4O_7$: 0.03 ppm to 0.15 ppm; $Ho_2O_3$: 0.06 ppm to 0.15 ppm; $Er_2O_3$: 0.12 ppm to 0.35 ppm; $Tm_2O_3$: 0.01 ppm to 0.05 ppm; $Yb_2O_3$: 0.12 ppm to 0.35 ppm; $Lu_2O_3$: 0 ppm to 0.15 ppm; $Y_2O_3$: 1.8 ppm to 4.5 ppm; and loss on ignition: 8% to 10%, and antibacterial rates of *Escherichia coli* and *Staphylococcus aureus* of the antibacterial ceramic tile are both greater than 90%.

2. The preparation method according to claim 1, wherein a method of applying the antibacterial protective glaze is glaze spraying, with a specific gravity of 1.35 $g/cm^3$ to 1.40 $g/cm^3$ and an application amount of 250 $g/m^2$ to 300 $g/m^2$.

3. The preparation method according to claim 1, wherein a maximum firing temperature is 1,200° C. to 1,220° C., and a firing duration is 60 to 70 minutes.

4. The preparation method according to claim 1, further comprising: applying a cover glaze on the surface of the green body before applying the antibacterial protective glaze containing the Ulan tea-quartz on the surface of the green body.

5. The preparation method according to claim 4, wherein a chemical composition of the cover glaze includes, in percentage by mass: $SiO_2$: 60% to 68%; $Al_2O_3$: 20% to 24%; alkali metal oxides: 4% to 7%; and $ZrO_2$: 3.2 to 9.6%.

6. The preparation method according to claim 4, wherein a method of applying the cover glaze is glaze spraying, with a specific gravity of 1.40 $g/cm^3$ to 1.50 $g/cm^3$ and an application amount of 500 $g/m^2$ to 600 $g/m^2$.

* * * * *